(12) United States Patent
Pousse et al.

(10) Patent No.: US 12,078,101 B2
(45) Date of Patent: Sep. 3, 2024

(54) METHOD FOR REGULATING A TURBOMACHINE COMPRISING A TEMPORARY POWER-INCREASING DEVICE

(71) Applicant: SAFRAN HELICOPTER ENGINES, Bordes (FR)

(72) Inventors: Frédéric Gaétan Pousse, Moissy-Cramayel (FR); Bertrand Yves Georges Moine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 57 days.

(21) Appl. No.: 17/605,898

(22) PCT Filed: Apr. 10, 2020

(86) PCT No.: PCT/EP2020/060332
§ 371 (c)(1),
(2) Date: Oct. 22, 2021

(87) PCT Pub. No.: WO2020/216639
PCT Pub. Date: Oct. 29, 2020

(65) Prior Publication Data
US 2022/0106908 A1 Apr. 7, 2022

(30) Foreign Application Priority Data
Apr. 24, 2019 (FR) ...................... 19 04310

(51) Int. Cl.
*F02C 3/30* (2006.01)
*F02C 9/28* (2006.01)
(52) U.S. Cl.
CPC ............... *F02C 3/305* (2013.01); *F02C 9/28* (2013.01); *F05D 2220/323* (2013.01);
(Continued)

(58) Field of Classification Search
CPC ... F02C 3/305; F02C 7/1435; F05D 2260/212
See application file for complete search history.

(56) References Cited

U.S. PATENT DOCUMENTS

| 2,795,107 A | 6/1957 | Haworth et al. |
| 2,974,482 A | 3/1961 | Kelley |

(Continued)

FOREIGN PATENT DOCUMENTS

| CN | 101818688 A | 9/2010 |
| CN | 101852133 A | 10/2010 |

(Continued)

OTHER PUBLICATIONS

Daniel Overbey, "Defining Humidity Ratio and Relative Humidity," Apr. 4, 2018, Downloaded Apr. 13, 2023 (Year: 2018).*

(Continued)

*Primary Examiner* — David P. Olynick
(74) *Attorney, Agent, or Firm* — Oblon, McClelland, Maier & Neustadt, L.L.P.

(57) ABSTRACT

A method for controlling a turbomachine including a temporary power-increasing device, the control method including a step wherein the flow rate of the coolant injected is adjusted as a function of the atmospheric pressure and/or of the ambient temperature and/or of at least one parameter such as the speed of rotation of a gas generator, the speed of rotation of a low-pressure turbine or of a power turbine, the gas pressure at the outlet of a compressor stage, the temperature at the inlet of the low-pressure turbine or of the power turbine, the engine torque, and/or the collective pitch of a helicopter rotor or the pitch of a propeller of a turboprop.

13 Claims, 2 Drawing Sheets

(52) U.S. Cl.
CPC .. *F05D 2220/329* (2013.01); *F05D 2270/053* (2013.01); *F05D 2270/16* (2013.01); *F05D 2270/3062* (2013.01)

(56) References Cited

U.S. PATENT DOCUMENTS

| | | | | | |
|---|---|---|---|---|---|
| 3,021,673 | A | * | 2/1962 | Mock | F02C 3/305 60/39.55 |
| 3,434,281 | A | * | 3/1969 | Donaldson | F02C 3/305 60/39.15 |
| 3,518,023 | A | * | 6/1970 | Britten | F02C 3/305 60/39.15 |
| 6,216,443 | B1 | * | 4/2001 | Utamura | F01K 21/047 60/39.092 |
| 2004/0025513 | A1 | * | 2/2004 | Walsh | F02C 7/10 60/39.53 |
| 2011/0138817 | A1 | * | 6/2011 | Vialle | F01D 25/18 60/39.08 |
| 2014/0373505 | A1 | * | 12/2014 | Dyrla | B64C 27/006 60/39.15 |
| 2015/0315965 | A1 | | 11/2015 | Moine et al. | |
| 2017/0322116 | A1 | * | 11/2017 | Escobedo Hernandez | F02D 41/1401 |
| 2017/0363005 | A1 | * | 12/2017 | Freidl | F02C 7/1435 |
| 2017/0370286 | A1 | * | 12/2017 | Lala | F02C 3/305 |
| 2018/0238235 | A1 | * | 8/2018 | Dailey | F02C 3/30 |

FOREIGN PATENT DOCUMENTS

| | | |
|---|---|---|
| DE | 10 2012 224 009 A1 | 6/2014 |
| EP | 2 896 806 A1 | 7/2015 |
| FR | 3 000 137 A1 | 6/2014 |
| JP | 2015-098788 A | 5/2015 |
| WO | 2015/157012 A1 | 10/2015 |

OTHER PUBLICATIONS

International Search Report issued on Jun. 25, 2020 in PCT/EP2020/060332 filed Apr. 10, 2020, therein, 2 pages.
Preliminary French Search Report issued on Jan. 7, 2020 in French Patent Application No. 1904310 filed Apr. 24, 2019, 8 pages (with Translation of Categories).
Chinese Office Action issued in Chinese Patent Application No. 202080031076.4 on Jan. 24, 2024, (w/ English translation).

* cited by examiner

[Fig. 1]
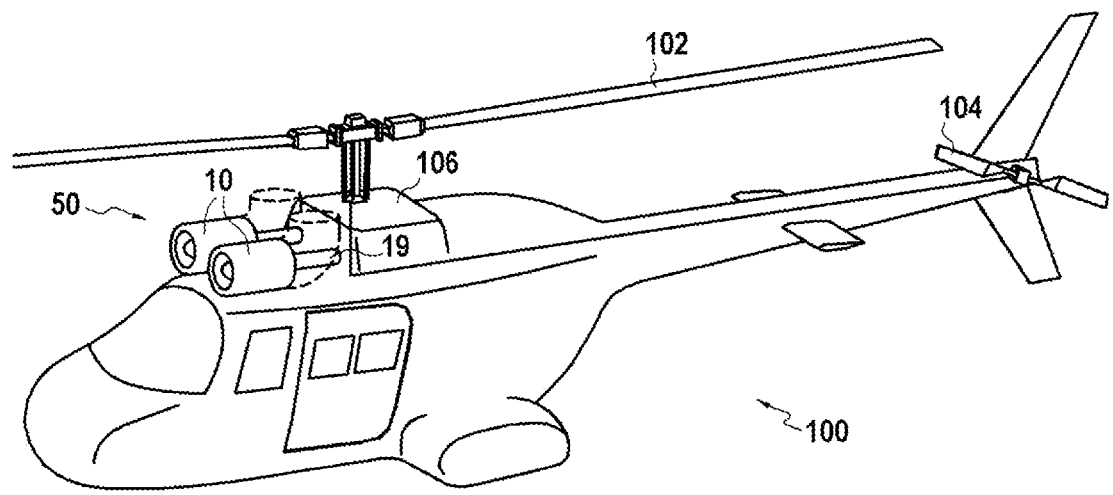
[Fig. 2]
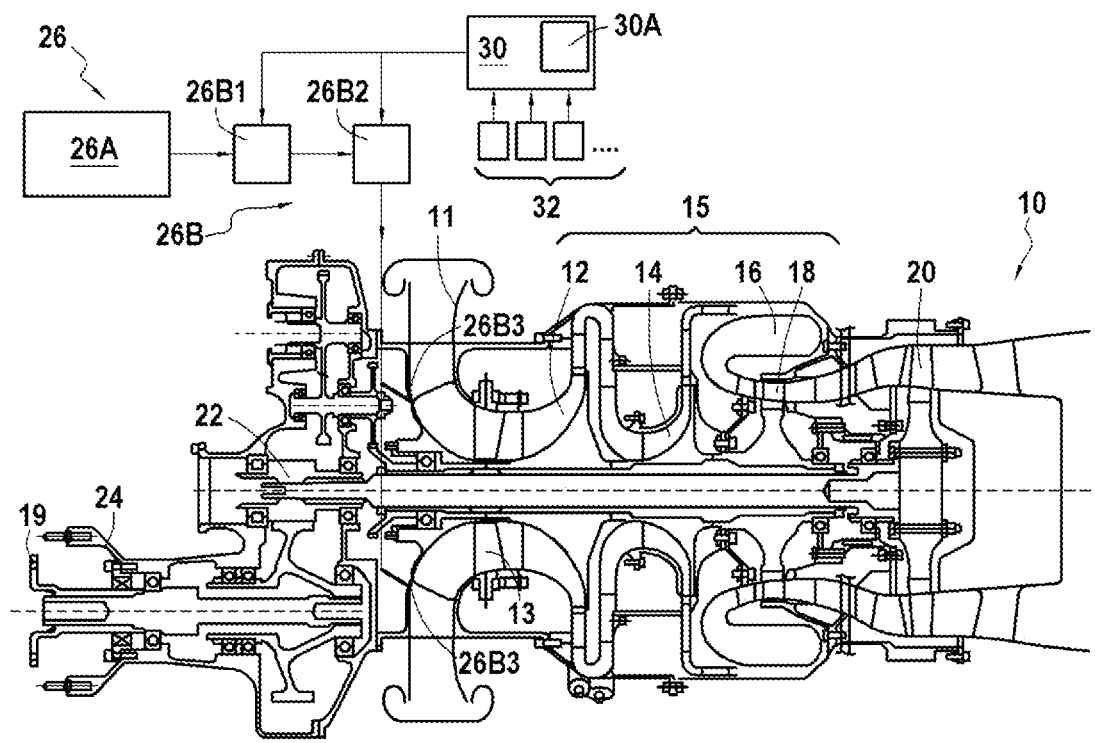

[Fig. 3]
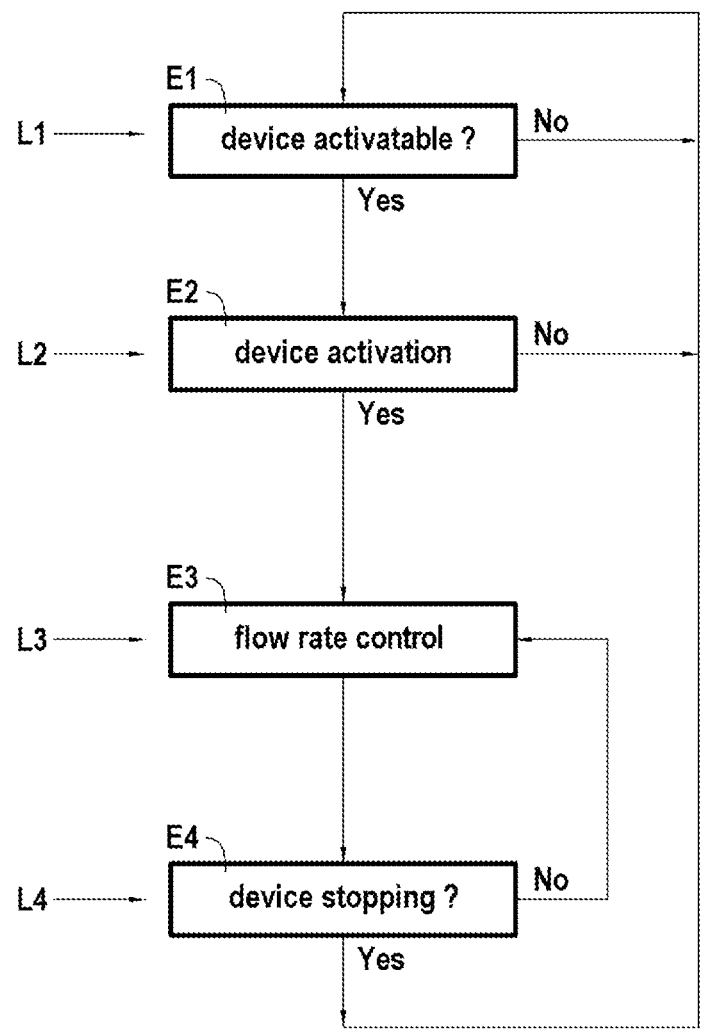

METHOD FOR REGULATING A TURBOMACHINE COMPRISING A TEMPORARY POWER-INCREASING DEVICE

TECHNICAL FIELD

This disclosure relates to a method for controlling a turbomachine comprising a temporary power-increasing device.

The term "turbomachine" denotes any craft with a gas turbine producing motive power, which can include, in particular, turbojet engines supplying the thrust needed for propulsion by reaction to the high-speed expulsion of hot gas, and turboshafts in which the motive power is supplied by the rotation of an engine shaft. For example, turboshafts are used as engines for helicopters, ships, trains, or else as industrial engines. Turboprops (turboshafts driving a propeller) are also turboshafts used as airplane engines.

PRIOR ART

Different devices are known for temporarily increasing the power of a turbomachine, for example by FR 3 000 137 or FR 3 057 614. Such devices are used to inject coolant upstream of the compressor of the turbomachine, which has the effect of temporarily increasing its power.

However, these known devices consume a great deal of coolant, which poses a problem given that this coolant must be carried onboard, which limits its availability. Moreover the injection is not optimized over the whole envelope. A need thus exists in this area.

SUMMARY OF THE INVENTION

An embodiment relates to a method for controlling a turbomachine comprising a temporary power-increasing device, said device comprising a reservoir configured to contain a coolant and an injection circuit configured to inject coolant via an injection manifold upstream of at least one compressor stage of the turbomachine, the flow rate of injection of the coolant being variable, said controlling method comprising a step of activating the temporary power-increasing device wherein coolant is injected upstream of at least one compressor stage of the turbomachine and a step of controlling the flow rate of the coolant wherein the flow rate of the coolant injected is adjusted as a function of the atmospheric pressure and/or of the ambient temperature and/or of at least one parameter of the turbomachine such as the speed of rotation of a gas generator, the speed of rotation of a low-pressure turbine or of a power turbine, the gas pressure at the outlet of a compressor stage, the temperature at the inlet of the low-pressure turbine or of the power turbine, the engine torque; and/or of at least one parameter of the aircraft for which the turbomachine is configured to be assembled such as the collective pitch of a helicopter rotor or the pitch of a propeller of one or more turboprops.

In this summary, the terms "downstream" and "upstream" are considered along the normal direction of flow of the gas inside the turbomachine.

For example, the coolant can be water or a mixture of water and an additive, for example anti-freeze, such as for example methanol, ethanol or glycol. Below, and unless otherwise indicated the term "coolant" should be understood to mean "cooling fluid".

For example, the injection flow rate can be variable owing to a variable flow-rate pump, for example a pump with fixed displacement but with a variable rotation speed of the rotor or else with a fixed rotation speed of the rotor but with variable displacement. In such an example, the pump can be used to pump the coolant from the reservoir and to inject it at a predetermined pressure via the manifold, in which case the coolant reservoir is not necessarily pressurized. According to another example, the injection flow rate can be variable owing to a variable opening valve. In such an example, the reservoir can be pressurized. According to yet another example, the injection circuit comprises a pump and a valve, the flow rate of the pump and/or the opening of the valve being variable.

Such a method is applicable whatever the type of aircraft for which the turbomachine is configured to be assembled (for example fixed- or rotating-wing, presence of one or more turbomachines, etc.).

The inventors have found that the flow rate of the coolant injected can be as close as possible to the actual requirement of the turbomachine for a given pressure increase, when it is adjusted as a function of the atmospheric pressure or the ambient temperature, or both. For example, the requirement for such an injection of coolant can be restricted to an envelope of low altitude and high temperature. For example from ISA to ISA+30 and from 0 m to 3000 m.

Specifically, the injection of coolant makes it possible to cool the air upstream of the compression stage, thus increasing its density and therefore the oxygen mass flow rate in the combustion chamber of the turbomachine. Moreover, the vaporization of the cooling fluid in the combustion chamber makes it possible to very substantially increase the pressure and/or volume density downstream of the combustion chamber, and therefore the mechanical work recovered in the turbine. Thus, the density and viscosity of the coolant varying as a function of the pressure and temperature, the atmospheric pressure and the ambient temperature are relevant parameters to be taken into consideration for adjusting the flow rate.

For example, control is exerted using a map (or table) with as input the atmospheric pressure and/or the ambient temperature, and as output the flow rate to be injected. According to another example, control can be exerted using a map with as input a parameter from among the atmospheric pressure and the ambient temperature and as output a flow rate to be injected, followed by any correction via another map or an analytical calculation (or analytical function) with as inlet the other parameter from among the atmospheric pressure and the ambient temperature and as output a correction of the flow rate (to be added or subtracted). According to yet another example, control can be exerted using an analytical calculation of the type "flowrate to be injected as a function of the atmospheric pressure and/or of the ambient temperature". According to another example control can be exerted using an analytical calculation of the type "flow rate to be injected as a function of a single one of the two parameters from among the atmospheric pressure and the ambient temperature, followed by a correction, where applicable, as a function of the other parameter from among the atmospheric pressure and the ambient temperature using a map or another analytical calculation with as input the other parameter and as output the correction of the flow rate (to be added or subtracted). For example, control is exerted using a function of the type Flow rate=Function (atmospheric pressure, ambient temperature), or else Flow rate=Function (atmospheric pressure)×Fixed correction coefficient depending on the ambient temperature, or else Flow rate=[Atmospheric pressure, Ambient temperature].

In certain embodiments, the flow rate of the coolant injected is adjusted such that the coolant/air ratio is between 0.5% and 15% in mass, for example between 1% and 12% in mass. This makes it possible to adapt to the power requirement, according to the point of the flight envelope (altitude, temperature) or the requirement of the pilot.

This makes it possible to take into account precisely the requirement for the flow rate to be injected whatever the point of the altitude/temperature envelope. Conversely, in the prior art only one point of the flow rate to be injected is taken into account, determining the dimensions at one point of the altitude/temperature envelope, and the flow rate to be injected was not recalibrated and therefore overdimensioned in the rest of the envelope.

In certain embodiments, the flow rate of the coolant injected is adjusted as a function of at least one other parameter from among the temperature of the coolant inside the reservoir and the pressure of the coolant at the level of the injection manifold.

The features of the coolant, such as its temperature and its pressure, are parameters representative of its viscosity and its density, and are therefore advantageous parameters for adjusting the flow rate. In other words, the physico-chemical parameters of the fluid are useful for adjusting the rating of the electric pump, such as to guarantee an appropriate flow rate.

In certain embodiments, the temporary power-increasing device is activated if an instantaneous loss of power of the turbomachine is detected and/or if entry into a predetermined rating of the turbomachine is detected and/or if an additional power requirement is detected and/or on request by the user.

This makes it possible to limit the consumption of the coolant to what is strictly necessary by activating the temporary power-increasing device solely when this is strictly necessary. For example the activation of the temporary power-increasing device can be automatic or manual. For example, by monitoring certain parameters such as the instantaneous power, the rating or the power requirement, the temporary power-increasing device can be activated automatically if threshold values are passed. The user can also determine that there is a requirement for a temporary power increase, and manually operate the temporary power-increasing device.

In certain embodiments, the temporary power-increasing device is activated as a function of at least one parameter of the turbomachine such as the speed of rotation of a gas generator, the speed of rotation of a low-pressure turbine or of a power turbine, the gas pressure at the outlet of a compressor stage, the temperature at the inlet of the low-pressure turbine or of the power turbine, the engine torque, and/or at least one parameter of the aircraft for which the turbomachine is configured to be assembled such as the collective pitch of a helicopter rotor or the pitch of a propeller of one or more turboprops.

These parameters, considered alone or in combination, may be representative of an instantaneous loss of power of the turbomachine, of entry into a predetermined rating of the turbomachine and/or an additional power requirement. Moreover, according to the situation, the pilot can authorize or not authorize the temporary power-increasing device to automatically trigger the injection of fluid if necessary or remain the sole authority to decide to activate the injection of fluid.

In certain embodiments, it is determined whether or not the temporary power-increasing device is activatable before activating it.

This makes it possible to check that the temporary power-increasing device is available before attempting to use it, which makes it possible to save coolant in the event of an attempt being made to use the temporary power-increasing device without it being available. This also makes it possible to guarantee the effectiveness of the injection (enough fluid) and to inform the pilot if there is not enough fluid. In other words, this makes it possible to guarantee the effectiveness of the injection and to inform the pilot of the availability of the function.

In certain embodiments, it is determined whether or not the temporary power-increasing device is activatable as a function of at least one parameter from among the level of coolant inside the reservoir, the temperature of the coolant inside the reservoir, the pressure of the coolant at the level of the injection manifold, and the speed of rotation of an electric pump of the injection circuit of the temporary power-increasing device.

These parameters, considered alone or in combination, may be representative of the availability of the temporary power-increasing device.

In certain embodiments, the activation of the temporary power-increasing device is stopped as a function of at least one parameter from among the level of coolant inside the reservoir, the temperature of the coolant inside the reservoir, the activation time of the temporary power-increasing device, the instantaneous power of the turbomachine, or on request by the user.

This makes it possible to limit the consumption of the coolant to what is strictly necessary. For example, the stopping of the power-increasing device can be automatic or manual. For example, by monitoring certain parameters such as the level of coolant inside the reservoir, the temperature of the coolant inside the reservoir, the activation time of the temporary power-increasing device, and/or the instantaneous power of the turbomachine, the temporary power-increasing device can be stopped automatically if threshold values are passed. The user can also determine that there is no longer a need to temporarily increase the power, and stop the temporary power-increasing device manually.

An embodiment relates to a computer program including instructions for executing the method as claimed in any of the embodiments described in this summary.

This program can use any programming language, and be in the form of source code, object code or intermediate code between source code and object code, such as in a partly compiled form, or in any other desirable form.

An embodiment relates to a recording medium readable by a computer on which is recorded the computer program according to this summary.

The recording medium can be any entity or device capable of storing a program. For example, the medium can include a storage means, such as a ROM, for example a CD-ROM or a microelectronic circuit ROM, or else a magnetic recording means, for example a diskette (floppy disk) or a hard disk.

Alternatively, the recording medium can be an integrated circuit or a dedicated electronics card into which the program is incorporated, the circuit or the card being suitable for executing or being used in the execution of the method in question.

The subject of this summary and its advantages will be better understood on reading the detailed description given hereinafter of different embodiments given by way of non-limiting example. This description refers to the pages of appended figures, wherein:

FIG. 1 shows an aircraft equipped with two turbomachines,

FIG. 2 shows in detail a turbomachine of FIG. 1, and

FIG. 3 shows a method for controlling the turbomachine of FIG. 2.

DESCRIPTION OF THE EMBODIMENTS

FIG. 1 illustrates a rotating-wing aircraft 100, in this example a helicopter with a main rotor 102 and an anti-torque tail rotor 104 coupled to a propulsion assembly 50 for their actuation. The propulsion assembly 50 illustrated comprises two turbomachines 10, namely in this example two turboshafts, of which the output shafts 12 are both connected to a main gear box 106 to actuate the main rotor 102 and the tail rotor 104.

A turbomachine 10 is described in more detail with reference to FIG. 2, this description being applicable to the two turbomachines 10. The turbomachine 10 comprises from upstream to downstream, an air intake casing 11, a high-pressure compressor 12, a low-pressure compressor 14, a combustion chamber 16, a high-pressure turbine 18 and a power turbine 20. The high and low-pressure compressors 12 and 14, the combustion chamber 16 and the high-pressure turbine 18 form a gas generator 15, configured to generate the gas needed to drive the power turbine 20. This power turbine 20 drives the rotation of an engine shaft 22 connected to a gear box 24, which drives the rotation of the shaft 12.

The turbomachine 10 has a temporary power-increasing device 26 comprising a reservoir 26A of coolant and an injection circuit 26B. In this example, the circuit 26B can have a pump 26B1 with a variable flow rate, a valve 26B2 with fixed opening (open/shut opening), and an injection manifold 26B3. In this example, the pump 26B1 can be an electric pump and the valve 26B2 can be an electrovalve. Thus, the coolant flows from the reservoir 26A toward the pump 26B1, then from the pump 26B1 toward the valve 26B2, and then from the valve 26B2 toward the injector 26B3. In this example, the injector 26B3 injects the coolant upstream of the high-pressure compressor 12, within the plenum of the air intake casing 11. For example, the injector 26B3 may be formed by flushing holes of the casing 11. According to a variant, the injector may open further downstream, in a stage of vanes for guiding the intake air 13, also known as Inlet Gas Vanes (IGV).

The temporary power-increasing device 26 is controlled in this example by a control unit 30, which directly controls the pump 26B1 and the valve 26B2. In this example, the control unit 30 can be the Full Authority Digital Electronic Control (or FADEC) system of the turbomachine 10. The control unit 30 receives information from various sensors 32, the number and nature of which are not limited. The control unit 30 comprises a ROM 30A forming a recording medium storing a computer program including the instructions for executing the control method described hereinafter. In other words, the control unit 30 forms an example of a computer while the ROM 30A forms an example of a recording medium on which is recorded a computer program including instructions for executing the control method hereinafter, when said computer program is executed by a computer.

The method for controlling the turbomachine 10 or, in other words, controlling the temporary power-increasing device 26 (hereinafter the device), is described with reference to FIG. 3. This method is executed by the control unit 30.

During a first step E1, it is determined whether or not the device 26 is activatable. In this example, it is possible to determine whether or not the device 26 is activatable as a function of a set L1 of parameters comprising the level Nf of coolant inside the reservoir 26A, the temperature Tf of the coolant inside the reservoir 26A, the pressure Pf of the coolant at the level of the injection manifold 26B3 and the speed of rotation Nep of the rotor of the pump 26B1 of the injection circuit 26B of the temporary power-increasing device 26. For example the values of these different parameters can be measured in real time via the sensors 32.

If it is determined that the device 26 is no longer activatable (No to step E1), for example because the level of coolant is too low, or because the pump 26B1 is not correctly operational, the method terminates. In this example, when the method terminates, it goes back to the start of step E1. For example, there can be a delay before starting the step E1 again. If it is determined that the device 26 is activatable (Yes to step E1), then the method goes on to step E2.

During step E2, it is determined whether or not the device 26 must be activated. In this example, it is possible to determine whether or not the device 26 must be activated as a function of a set L2 of parameters comprising the speed of rotation N1 of the gas generator 15, the speed of rotation N2 of the power turbine 20, the pressure P3 of the gas at the outlet of the compressor 14 (i.e. of all the stages of the compressor), the temperature T45 at the inlet of the power turbine 20, the engine torque TQ of the shaft 22, the collective pitch XPC of the rotor 102 and any user request. For example the values of these different parameters can be measured in real time via the sensors 32.

If it is determined that the device 26 must not be activated (No to step E2) the method terminates. In this example, when the method terminates, it goes back to the start of step E1. For example, there may be a delay before starting the step E1 again. If it is determined that the device 26 must be activated (Yes to E2), for example because one detects, on the basis of the above parameters, a instantaneous loss of power of the turbomachine 10 or entry into a predetermined rating of the turbomachine 10 or a requirement for additional power or a request of the user then the device 26 is activated. To do this, the control unit can activate the pump 26B1 and open the valve 26B2. Then the method goes on to step E3.

During step E3, the flow rate of the coolant injected via the manifold 26B3 is controlled. In this example, it is possible to control the flow rate as a function of a set L3 of parameters comprising the atmospheric pressure P0, the ambient temperature T0, the temperature Tf of the coolant inside the reservoir 26A, the pressure Pf of the coolant at the level of the injection manifold 26B3, the speed of rotation N1 of the gas generator 15, the speed of rotation N2 of the power turbine 20, the pressure P3 of the gas at the outlet of the compressor 14 (i.e. of all the stages of the compressor), the temperature T45 at the inlet of the power turbine 20, the engine torque TQ of the shaft 22, and the collective pitch XPC of the rotor 102. For example the values of these different parameters can be measured in real time via the sensors 32. To adjust the flow rate, the control unit 30 directly drives the flow rate delivered by the pump 26B1. For example, the flow rate can be adjusted such that the ratio of coolant/air is between 1% and 12% in mass.

When the flow rate is adjusted, the method goes on to step E4, during which it is determined whether or not the device 26 can be stopped. For example, there is a delay between the step E3 and the step E4, but not necessarily.

During step E4, it is determined whether or not the device 26 can be stopped. For example, it can be determined that the device 26 can be stopped as a function of a set L4 of parameters comprising the level Nf of the coolant inside the reservoir 26A, the temperature Tf of the coolant inside the reservoir 26A, the activation time of the temporary power-increasing device 26 (i.e. the time elapsed between the activation in step E2 and step E4), the instantaneous power of the turbomachine 10 or a user request. For example the values of these different parameters can be measured in real time via the sensors 32.

If it is determined that the device 26 must not be stopped (No in step E4), then the device 26 is left active, and the method returns to the control step E3. For example, there may be a delay before starting step E3 again. If it is determined that the device 26 must be stopped (Yes in step E4), for example because there is no longer enough coolant in the reservoir 26A, because the device 26 has been active for a predetermined time period, because the instantaneous power of the turbomachine is at an unacceptable threshold, or on request by the user, then the device 26 is stopped. For example, to stop the device 26, the control unit 30 stops the pump 26B1 and closes the valve 26B2. The method thus terminates and goes back to the start of step E1. For example, there can be a delay before starting step E1 again.

Although this invention has been described with reference to specific embodiments, it is obvious that modifications and changes can be made to these examples without departing from the general scope of the invention as defined by the claims. In particular, individual features of the different embodiments illustrated/mentioned may be combined in additional embodiments. Consequently, the description and the drawings must be considered in an illustrative sense rather than a restrictive one.

It is also obvious that all the features described with reference to a method are transposable, alone or in combination, to a device, and conversely, all the features described with reference to a device are transposable, alone or in combination, to a method.

The invention claimed is:

1. A method for controlling a turbomachine configured to be assembled on an aircraft, the turbomachine comprising a temporary power-increasing device, said device comprising a reservoir configured to contain a coolant and an injection circuit configured to inject the coolant via an injection manifold upstream of at least one compressor stage of the turbomachine, a flow rate of injection of the coolant being variable, said controlling method comprising:
   activating the temporary power-increasing device wherein the coolant is injected upstream of the at least one compressor stage of the turbomachine; and
   controlling the flow rate of the coolant wherein the flow rate of the coolant injected is adjusted as a function of at least one of an atmospheric pressure and an ambient temperature,
   wherein the temporary power-increasing device is activated if at least one of an instantaneous loss of power of the turbomachine is detected, entry into a predetermined rating of the turbomachine is detected, an additional power requirement is detected, and on request by a user, and
   wherein the temporary power-increasing device is activated as a function of:
      the following parameters of the turbomachine including a speed of rotation of a gas generator, a speed of rotation of a low-pressure turbine or of a power turbine, a gas pressure at an outlet of a compressor stage, a temperature at an inlet of the low-pressure turbine or of the power turbine, and an engine torque, and
      at least one parameter of the aircraft for which the turbomachine is configured to be assembled selected among a collective pitch of the helicopter rotor or a pitch of a propeller of one or more turboprops.

2. The method as claimed in claim 1, wherein the flow rate of the coolant injected is adjusted such that a coolant/air ratio is between 0.5% and 15% in mass.

3. The method as claimed in claim 1, wherein the flow rate of the coolant injected is adjusted as a function of at least one other parameter from among a temperature of the coolant inside the reservoir and a pressure of the coolant in the injection manifold.

4. The method as claimed in claim 1, further comprising determining whether or not the temporary power-increasing device is activable before the activating the temporary power-increasing device.

5. The method as claimed in claim 4, wherein the determining whether or not the temporary power-increasing device is activatable is a function of the following parameters including a level of coolant inside the reservoir, a temperature of the coolant inside the reservoir, a pressure of the coolant in the injection manifold, and a speed of rotation of an electric pump of the injection circuit of the temporary power-increasing device.

6. The method as claimed in claim 1, wherein the activation of the temporary power-increasing device is stopped as a function of at least one parameter from among a level of coolant inside the reservoir, a temperature of the coolant inside the reservoir, an activation time of the temporary power-increasing device, an instantaneous power of the turbomachine, or on request by a user.

7. A non-transitory storage with program stored thereon including instructions for executing the method as claimed in claim 1, when said program is executed by a computer.

8. An integrated circuit or electronics card configured for executing the method as claimed in claim 1.

9. The method as claimed in claim 1, wherein the flow rate of the coolant injected is adjusted such that a coolant/air ratio is between 1% and 12% in mass.

10. The method as claimed in claim 1, wherein the coolant is injected upstream of a high-pressure compressor of the turbomachine.

11. A method for controlling a turbomachine configured to be assembled on an aircraft, the turbomachine comprising a temporary power-increasing device, said device comprising a reservoir configured to contain a coolant and an injection circuit configured to inject the coolant via an injection manifold upstream of at least one compressor stage of the turbomachine, a flow rate of injection of the coolant being variable, said controlling method comprising:
   activating the temporary power-increasing device wherein the coolant is injected upstream of the at least one compressor stage of the turbomachine; and
   controlling the flow rate of the coolant wherein the flow rate of the coolant injected is adjusted as a function of an atmospheric pressure and of an ambient temperature and of the following parameters of the turbomachine including a speed of rotation of a gas generator, a speed of rotation of a low-pressure turbine or of a power turbine, a gas pressure at an outlet of a compressor stage, a temperature at an inlet of the low-pressure turbine or of the power turbine, an engine torque, and of at least one parameter of the aircraft for which the turbomachine is configured to be assembled including a collective pitch of a helicopter rotor or a pitch of a propeller of one or more turboprops.

12. A method for controlling a turbomachine configured to be assembled on an aircraft, the turbomachine comprising a temporary power-increasing device, said device comprising a reservoir configured to contain a coolant and an injection circuit configured to inject the coolant via an injection manifold upstream of at least one compressor stage of the turbomachine, a flow rate of injection of the coolant being variable, said controlling method comprising:
 activating the temporary power-increasing device wherein the coolant is injected upstream of the at least one compressor stage of the turbomachine; and
 controlling the flow rate of the coolant wherein the flow rate of the coolant injected is adjusted as a function of an atmospheric pressure and of an ambient temperature, a temperature of the coolant inside the reservoir and a pressure of the coolant in the injection manifold, and of the following parameters of the turbomachine including a speed of rotation of a gas generator, a speed of rotation of a low-pressure turbine or of a power turbine, a gas pressure at an outlet of a compressor stage, a temperature at an inlet of the low-pressure turbine or of the power turbine, an engine torque, and of at least one parameter of the aircraft for which the turbomachine is configured to be assembled including a collective pitch of a helicopter rotor or a pitch of a propeller of one or more turboprops.

13. A method for controlling a turbomachine configured to be assembled on an aircraft, the turbomachine comprising a temporary power-increasing device, said device comprising a reservoir configured to contain a coolant and an injection circuit configured to inject the coolant via an injection manifold upstream of at least one compressor stage of the turbomachine, a flow rate of injection of the coolant being variable, said controlling method comprising:
 activating the temporary power-increasing device wherein the coolant is injected upstream of the at least one compressor stage of the turbomachine;
 controlling the flow rate of the coolant wherein the flow rate of the coolant injected is adjusted as a function of at least one of an atmospheric pressure and an ambient temperature; and
 determining whether or not the temporary power-increasing device is activable before the activating the temporary power-increasing device,
 wherein the determining whether or not the temporary power-increasing device is activatable is a function of the following parameters including a level of coolant inside the reservoir, a temperature of the coolant inside the reservoir, a pressure of the coolant in the injection manifold, and a speed of rotation of an electric pump of the injection circuit of the temporary power-increasing device.

\* \* \* \* \*